United States Patent
Han et al.

(10) Patent No.: US 7,677,805 B2
(45) Date of Patent: Mar. 16, 2010

(54) FLUID DYNAMIC BEARING AND HARD DISK DRIVE EMPLOYING THE SAME

(75) Inventors: Jae-hyuk Han, Seoul (KR); Dong-ho Oh, Seoul (KR); Yong-kyu Byun, Yongin-si (KR); Cheol-soon Kim, Anyang-si (KR); Jeong-seok Koh, Yongin-si (KR); Nam-hoon Lee, Seoul (KR); Ja-choon Koo, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 495 days.

(21) Appl. No.: 11/254,762

(22) Filed: Oct. 21, 2005

(65) Prior Publication Data

US 2006/0093245 A1    May 4, 2006

(30) Foreign Application Priority Data

Nov. 3, 2004    (KR) ...................... 10-2004-0088915

(51) Int. Cl.
*F16C 32/06* (2006.01)

(52) U.S. Cl. ...................... 384/121; 384/107; 384/112

(58) Field of Classification Search .................. 384/100, 384/107, 112, 121, 123, 108–111, 113–120, 384/122, 124; 310/90, 90.5, 98.08; 360/99.04, 360/99.07, 99.08; 29/898.041
See application file for complete search history.

(56) References Cited

U.S. PATENT DOCUMENTS

| | | | |
|---|---|---|---|
| 3,870,382 A * | 3/1975 | Reinhoudt | 384/123 |
| 5,504,637 A * | 4/1996 | Asada et al. | 384/107 |
| 5,653,540 A * | 8/1997 | Heine et al. | 384/107 |
| 5,678,929 A * | 10/1997 | Parsoneault et al. | 384/112 |
| 5,795,074 A * | 8/1998 | Rahman et al. | 384/121 |
| 5,977,674 A * | 11/1999 | Leuthold et al. | 310/90 |

(Continued)

FOREIGN PATENT DOCUMENTS

CN        1168560 A      12/1997

(Continued)

OTHER PUBLICATIONS

Chinese Office Action issued for Jun. 19, 2009, for counterpart CN Application No. 200510116928.7.

*Primary Examiner*—Marcus Charles
(74) *Attorney, Agent, or Firm*—Sughrue Mion, PLLC

(57) ABSTRACT

A fluid dynamic bearing is constructed to support stably a rotating body to which a non-uniform force is applied, and a hard disk drive (HDD) employing the fluid dynamic bearing is provided. The fluid dynamic bearing includes a journal bearing part supporting a rotary shaft in a radial direction of the rotary shaft, a thrust part formed at one end of the rotary shaft, a thrust bearing part facing the thrust part and supporting the rotary shaft in a longitudinal direction of the rotary shaft, and a plurality of grooves formed on a surface of the thrust bearing part and/or the thrust part. The plurality of grooves include a first groove group including a plurality of grooves having the same shape and arrangement, and a second groove group adjacent to the first groove group and including at least one groove asymmetric with respect to the grooves of the first groove group.

14 Claims, 7 Drawing Sheets

U.S. PATENT DOCUMENTS

| | | | |
|---|---|---|---|
| 6,017,150 A * | 1/2000 | Lee ............................ | 384/123 |
| 6,276,831 B1 * | 8/2001 | Takahashi et al. ........... | 384/100 |
| 6,493,181 B1 * | 12/2002 | Ichiyama .................... | 384/123 |
| 6,554,476 B2 * | 4/2003 | Ishikawa et al. ............ | 384/123 |
| 6,933,642 B2 * | 8/2005 | Kusaka et al. .............. | 310/90.5 |
| 6,943,985 B2 * | 9/2005 | Kull et al. ................ | 360/99.08 |
| 2001/0036327 A1 * | 11/2001 | Ishikawa et al. ............ | 384/121 |

FOREIGN PATENT DOCUMENTS

| | | | |
|---|---|---|---|
| CN | 1259681 A | | 7/2000 |
| JP | 51-19149 | | 2/1976 |
| JP | 60-249681 A | * | 12/1985 |
| JP | 2000-199520 A | | 7/2000 |
| JP | 2002-21844 A | * | 1/2002 |
| JP | 2003-269443 A | | 9/2003 |

* cited by examiner

US 7,677,805 B2

FLUID DYNAMIC BEARING AND HARD DISK DRIVE EMPLOYING THE SAME

BACKGROUND OF THE INVENTION

This application claims priority from Korean Patent Application No. 2004-0088915, filed on Nov. 3, 2004, in the Korean Intellectual Property Office, the disclosure of which is incorporated herein in its entirety by reference.

1. Field of the Invention

The present invention relates to a fluid dynamic bearing for supporting a rotating body and a hard disk drive (HDD) employing the fluid dynamic bearing and, more particularly, to a fluid dynamic bearing constructed to support stably a rotating body on which an non-uniform force is applied, and an HDD employing the fluid dynamic bearing.

2. Description of the Related Art

Hard disk drives (HDDs) information storage devices that reproduce data stored in a disk or record data on the disk using a read/write head. In the HDDs, the read/write head functions by being moved by an actuator to a desired position a predetermined height above a recording surface of the rotating disk.

With recent industrial development, HDDs are being employed in various types of electronic devices, such as mobile phones, MP3 players, and game devices. To this end, there is a demand for compact and slim HDDs.

As an effort to make HDDs slim, a single-head HDD in which a hard disk has one recording surface and a single head which faces the recording surface has been disclosed.

FIG. 1 is a schematic cross-sectional view illustrating essential parts of a conventional single-head HDD. FIG. 2 is a bottom view of a thrust bearing part of the single-head HDD of FIG. 1. FIG. 3 is a sectional view of the thrust bearing part taken along line III-III of FIG. 2.

Referring to FIGS. 1 through 3, the conventional single-head HDD includes a fluid dynamic bearing 10, a rotary shaft 20 rotatably inserted into the fluid dynamic bearing 10, a hard disk 30 installed on the rotary shaft 20 and having one recording surface 31, a driving source 40 providing a rotational force to the hard disk 30, and a head 50 recording and reproducing information on the hard disk 30.

The rotary shaft 20 is located at a center of rotation of the hard disk 30 through a rotor housing 25, and includes a journal part 21 supported in a radial direction and a thrust part 23 supported in a longitudinal direction of the rotary shaft 20 by the fluid dynamic bearing 10.

The fluid dynamic bearing 10 has a hollow space 10a into which the rotary shaft 20 is rotatably inserted, and includes a journal bearing part 11 formed along an outer circumference of the journal part 21 and a thrust bearing part 15 facing the thrust part 23 and supporting the rotary shaft 20 in the longitudinal direction of the rotary shaft 20.

Referring to FIGS. 2 and 3, the thrust bearing part 15 has an annular shape, and includes a plurality of grooves 17 formed on a surface thereof facing the thrust part 23 (see FIG. 1). As shown in FIGS. 2 and 3, each of the plurality of grooves 17 has a symmetric spiral pattern having the same shape and arrangement. That is, when a tangent line 15a touching an outer circumferential surface of the thrust bearing part 15 and a line segment 17a extending from a groove 17 form a groove angle $\theta_G$ therebetween, all the grooves 17 have the same groove angle of $\theta_G$. Further, when the thrust bearing unit 15 is sectioned taken along line III-III of FIG. 2, all the grooves 17 have the same groove width $d_g$, and ridges 19, each of which is disposed between adjacent grooves 17, have the same width $d_r$. Accordingly, if the rotary shaft 20 is positioned at the center of rotation of the hard disk 30 and a uniform load is applied to the hard disk 30, the rotary shaft 20 is stably supported by the same force indicated by arrows 63a and 63b in the longitudinal direction.

The driving source 40 includes a magnet 41 disposed inside the rotor housing 25 and a stator core 45 formed along an outer circumference of the fluid dynamic bearing 10. The driving source 40 rotates the hard disk 30 using an electromagnetic force generated by applying current to the stator core 45.

The head 50 is disposed on a slider installed at one end of a suspension 55, and is reciprocated by an actuator (not shown) in a predetermined area over the recording surface 31 to record and reproduce information on the recording surface 31. The slider is lifted when the hard disk 30 rotates, and the head 50 is maintained at a predetermined height H due to a gram load 61 applied to the suspension 55. Here, a force 62 counteracting a force of lifting the head 50 is applied to the hard disk 30 in a direction opposite to a direction in which the head 50 is lifted.

Accordingly, as shown, when the HDD employs the single head to be made compact, an unbalanced force is applied to the hard disk 30 due to the counteractive force 62 between the head 50 and the hard disk 30. In the meantime, when the thrust bearing part 15 with the symmetric structure is used, the hard disk 30 and the rotary shaft 20 slantingly rotate in an unstable state due to the unbalanced force applied to the hard disk 30, as shown by a two dot and dash line in FIG. 1. Thus, information recording and reproduction performances deteriorate and noises are caused.

SUMMARY OF THE INVENTION

The present invention provides a fluid dynamic bearing including a thrust bearing part constructed to support stably a rotating body when a non-uniform force is applied to the rotating body.

The present invention also provides a single-head hard disk drive constructed to rotate stably a hard disk by offsetting a counteractive force applied to a single head.

According to an aspect of the present invention, there is provided a fluid dynamic bearing comprising: a journal bearing part supporting a rotary shaft in a radial direction of the rotary shaft; a thrust part formed at one end of the rotary shaft; a thrust bearing part facing the thrust part and supporting the rotary shaft in a longitudinal direction of the rotary shaft; and a plurality of grooves formed on a surface of at least one of the thrust bearing part and the thrust part, wherein the plurality of grooves comprise: a first groove group including a plurality of grooves having the same shape and arrangement; and a second groove group adjacent to the first groove group and including at least one groove asymmetric with respect to the grooves of the first groove group.

According to another aspect of the present invention, there is provided a hard disk drive comprising: a hard disk with one recording surface on which information is recorded; a fluid dynamic bearing rotatably supporting a rotary shaft of the hard disk, and including a journal bearing part supporting the rotary shaft in a radial direction of the rotary shaft, a thrust part formed at one end of the rotary shaft, a thrust bearing part facing a thrust part and supporting the rotary shaft in a longitudinal direction of the rotary shaft, and a plurality of grooves formed on a surface of at least one of the thrust bearing part and the thrust part; a driving source providing a rotational force to the hard disk; and a head for recording and reproducing information while flying over the recording surface of the hard disk, wherein the plurality of grooves comprise: a first groove group including a plurality of grooves having the same shape and arrangement; and a second groove group located on a predetermined portion of the hard disk where a load is applied by the head, and including at least one groove asymmetric with respect to the grooves of the first groove group.

BRIEF DESCRIPTION OF THE DRAWINGS

The above and other features and advantages of the present invention will become more apparent by describing in detail exemplary embodiments thereof with reference to the accompanying drawings, in which.

DETAILED DESCRIPTION OF ILLUSTRATIVE, NON-LIMITING EMBODIMENTS OF THE INVENTION

The present invention will now be described more fully with reference to the accompanying drawings, in which illustrative, non-limiting embodiments of the invention are shown.

Figure 1:
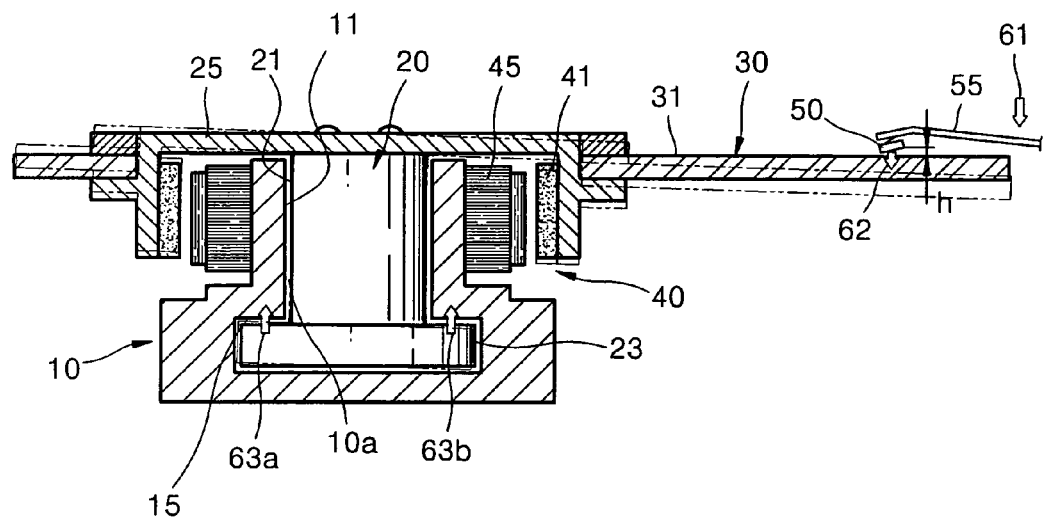
FIG. 1 is a schematic cross-sectional view of a conventional single-head hard disk drive (HDD)
Figure 2:
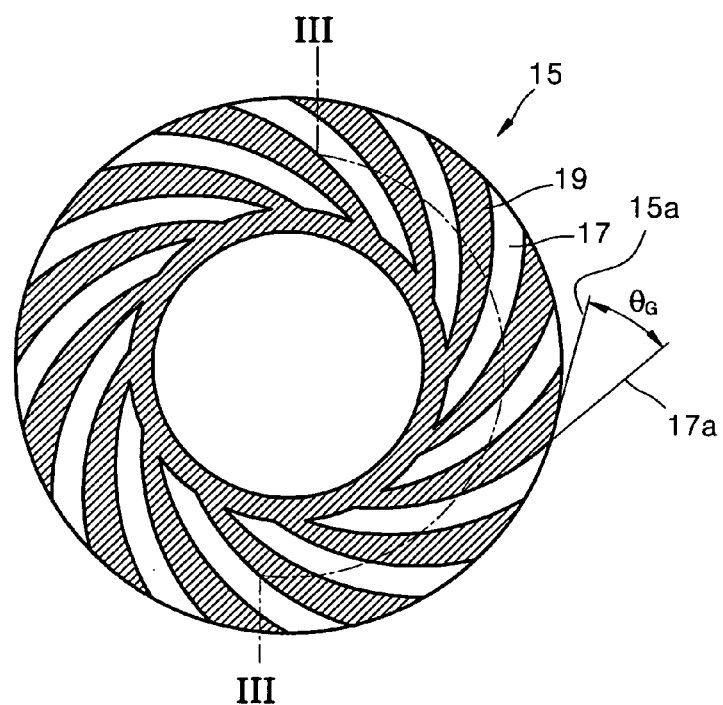
FIG. 2 is a bottom view of a thrust bearing part of a conventional fluid dynamic bearing.
Figure 3:
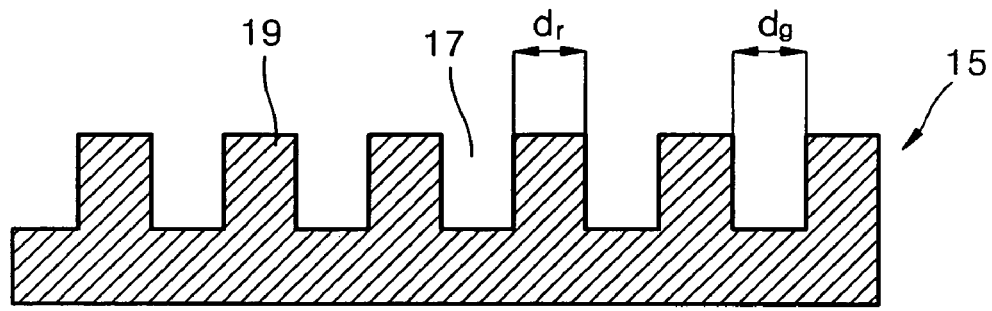
FIG. 3 is a sectional view of the thrust bearing part taken along line III-III of FIG. 2.
Figure 4:
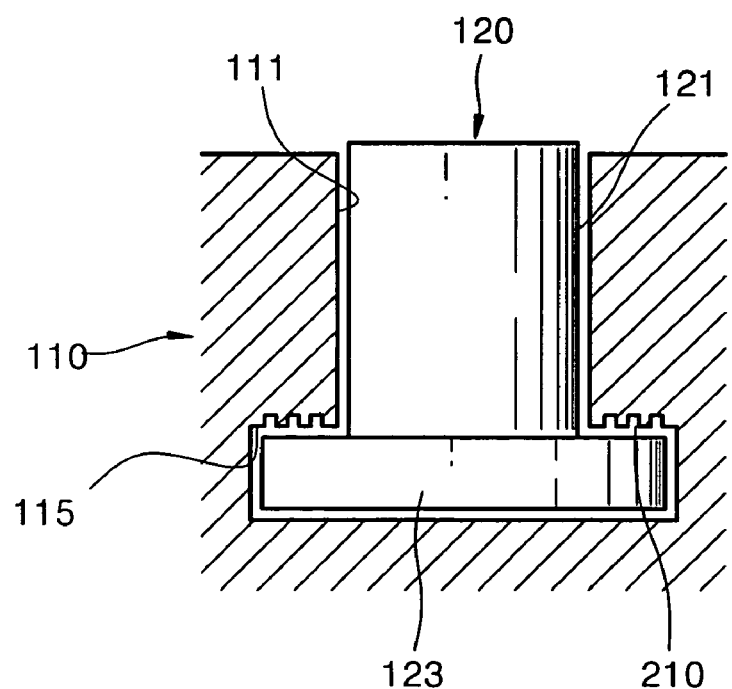
FIG. 4 is a partial cross-sectional view of a fluid dynamic bearing according to an embodiment of the present invention.

Referring to FIG. 4, a fluid dynamic bearing 110 according to an exemplary embodiment of the present invention has a hollow space into which a rotary shaft 120 is rotatably inserted. The fluid dynamic bearing 110 includes a journal bearing part 111 and a thrust bearing part 115. The journal bearing part 111 faces a journal, part 121 formed on an outer circumference of the rotary shaft 120, and supports the rotary shaft 120 in a radial direction of the rotary shaft 120. The thrust bearing part 115 faces a thrust part 123 formed at one end of the rotary shaft 120, and supports the rotary shaft 120 in a longitudinal direction of the rotary shaft 120. To this end, the thrust bearing part 115 and/or the thrust part 123 includes a plurality of grooves 210 formed on a surface thereof facing each other.

Even when a force is locally applied to a rotating body (not shown) rotatably supported by the rotary shaft 120, the fluid dynamic bearing 110 can uniformly support the rotating body by modifying the structure of the grooves 210 formed on the thrust bearing part 115.

Figure 5:
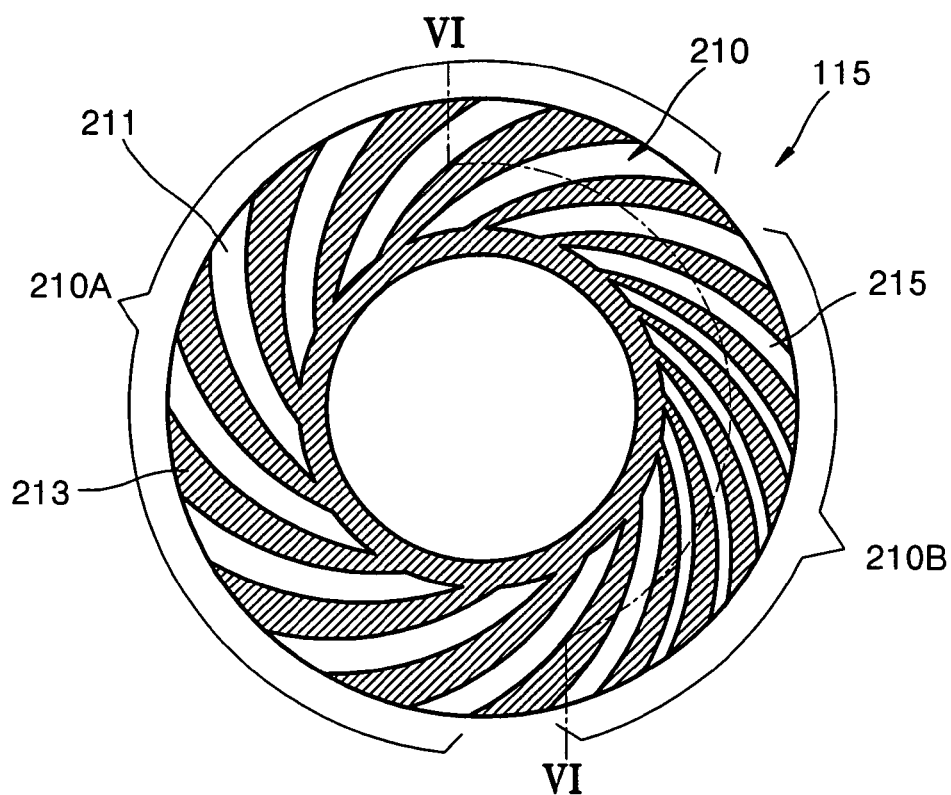
FIG. 5 is a bottom view of a thrust bearing part of the fluid dynamic bearing of FIG. 4.
Figure 6:
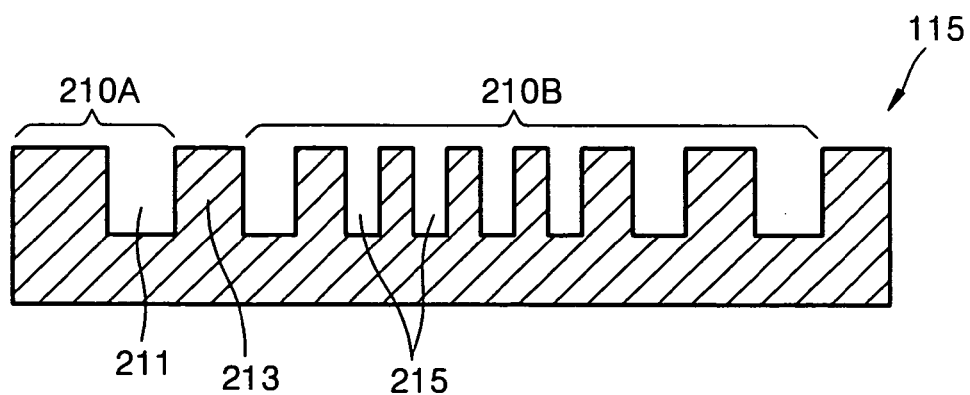
FIG. 6 is a sectional view of the thrust bearing part taken along line VI-VI of FIG. 5.

Referring to FIGS. 5 and 6, each of the grooves 210 of the thrust bearing part 115 has a spiral pattern, and the thrust bearing part 115 is divided into a first groove group 210A having a symmetric arrangement and a second groove group 210B having an asymmetric arrangement.

The first groove group 210A includes a plurality of grooves 211 having the same shape and arrangement, and covers more than a half of the annular thrust bearing part 115. Here, each of ridges 213 having the same size is formed between adjacent grooves 211 of the plurality of grooves 211.

The second groove group 210B includes at least one groove 215 asymmetric with respect to the grooves 211 of the first groove group 210A. FIGS. 5 and 6 exemplarily illustrate that the second groove group 210B includes seven grooves 215. Here, the plurality of grooves 215 of the second groove group 210B have widths varying depending on the arrangement therof.

It is preferable, but not necessary, that among the plurality of grooves 215 of the second groove group 210B, a width of a groove located at a center of the second groove group 210B is relatively less than a width of a groove adjacent to the first groove group 210A.

When the rotary shaft 120 rotates, a fluid dynamic force generated between the thrust part 123 of the rotary shaft 120 and the thrust bearing part 115 is as follows.

Figure 7:
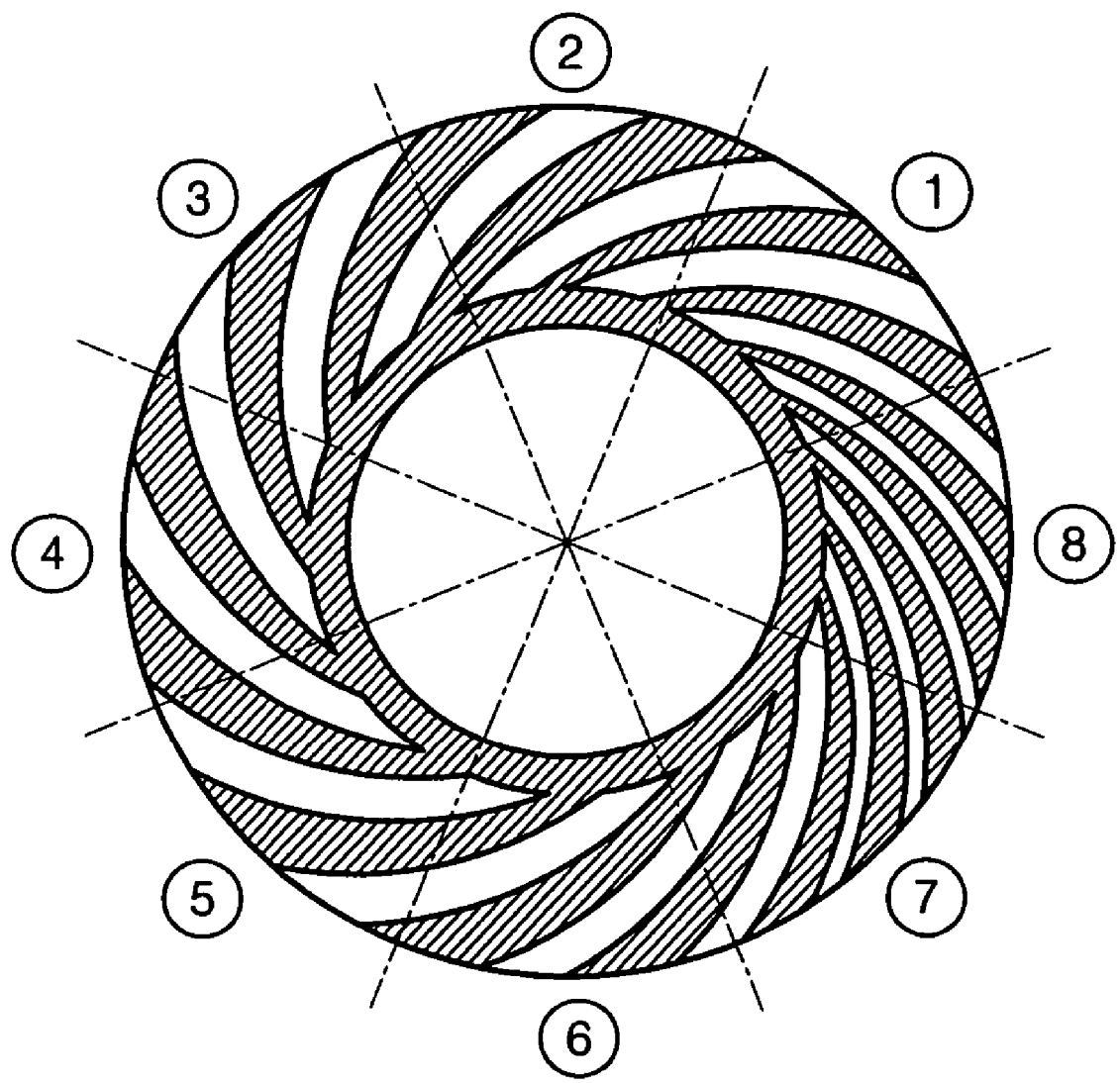
FIG. 7 is a bottom view of the thrust bearing part for explaining stiffness and damping coefficients of the fluid dynamic bearing of FIG. 4.

FIG. 7 is a bottom view of the thrust bearing part of FIG. 6, which is divided into eight sections. A large part of the second groove group 210B is formed in an eighth section. In this case, stiffness and damping coefficients of the sections including the eighth section were analyzed and are shown in Table 1.

TABLE 1

| Section | Stiffness Coefficient [N/m] | Damping Coefficient [Ns/m] |
| --- | --- | --- |
| 1 | 10.6 | 0.0305 |
| 2 | 11.9 | 0.0304 |
| 3 | 11.9 | 0.0308 |
| 4 | 11.9 | 0.0300 |
| 5 | 11.9 | 0.0300 |
| 6 | 11.9 | 0.0306 |
| 7 | 10.8 | 0.0327 |
| 8 | 18.0 | 0.0295 |

Referring to Table 1, the eighth section in which the largest part of the second groove group 210B is formed has the greatest stiffness coefficient and the least damping coefficient. It can be seen from Table 1 that a higher fluid dynamic force is generated in the second groove group 210B than in the first groove group 210A.

Accordingly, when a non-uniform load is applied to the rotating body supported by the rotary shaft 120, the created unbalance during rotation of the rotating body can be compensated by locating a groove with the least width of the second groove group 210B on a portion where the greatest load is applied.

Figure 8:
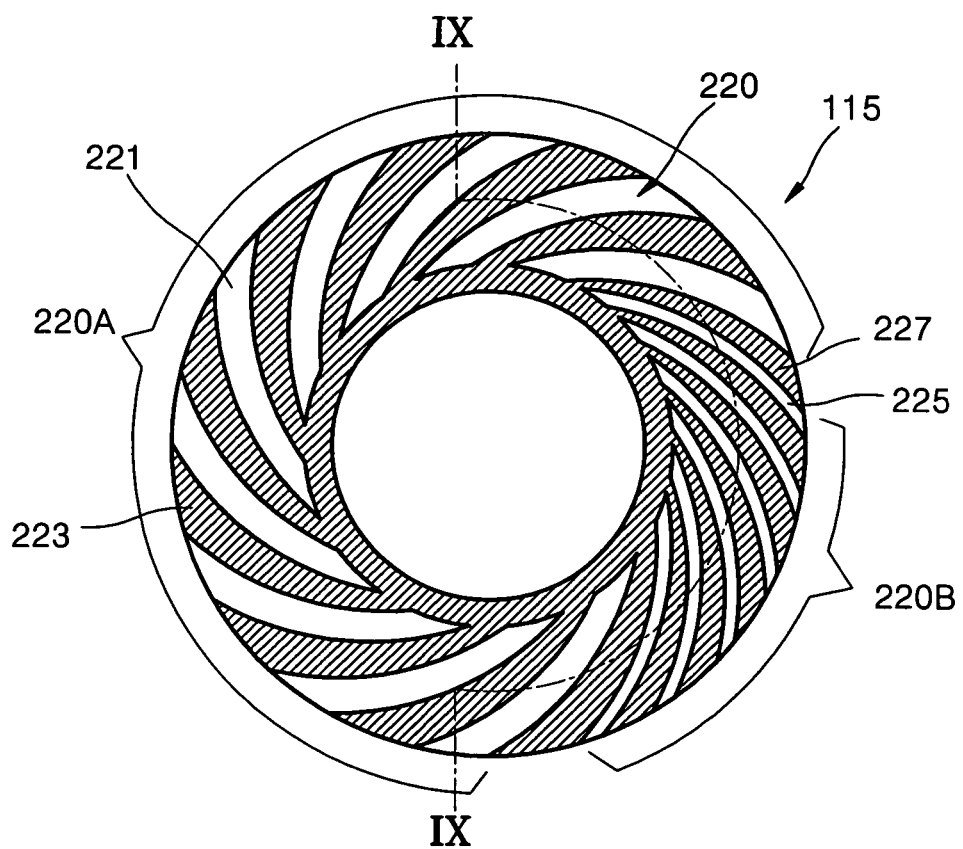
FIG. 8 is a bottom view of a thrust bearing part of a fluid dynamic bearing according to another exemplary embodiment of the present invention.
Figure 9:
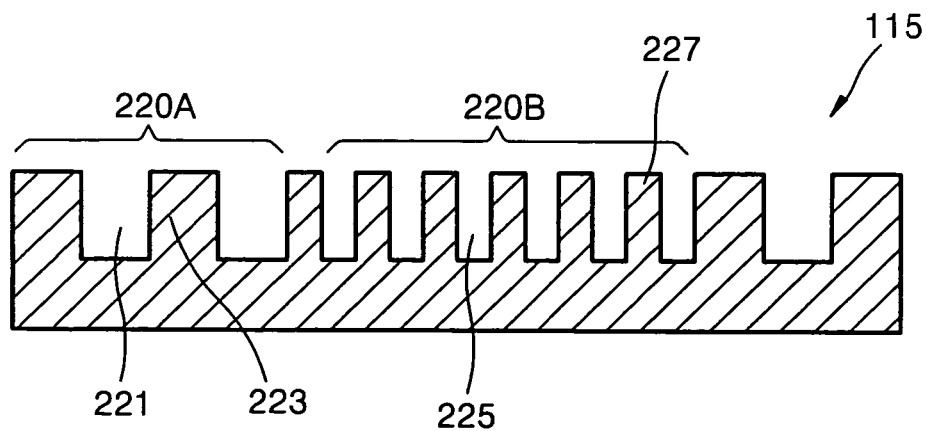
FIG. 9 is a sectional view of the thrust bearing part taken along line IX-IX of FIG. 8.

Referring to FIGS. 8 and 9, each of grooves of a thrust bearing part 115 of a fluid dynamic bearing according to another exemplary embodiment of the present invention has a spiral pattern, and the thrust bearing part 115 is divided into a first groove group 220A and a second groove group 220B.

The first groove group 220A includes a plurality of grooves 221 having the same shape and arrangement and covers more than a half of the annular thrust bearing part 115. Here, each of ridges 223 having the same size is formed between adjacent grooves of the plurality of grooves 221.

The second groove group 220B includes at least one groove 225 asymmetric with respect to the grooves 221 of the first groove group 220A. FIGS. 8 and 9 exemplarily illustrate that the second groove group 220B includes six grooves 225. Here, the plurality of grooves 225 of the second groove group 220B have the same size, shape, and arrangement.

It is preferable, but not necessary, that a width of each of the grooves 225 of the second groove group 220B be relatively less than a width of each of the grooves 221 of the first groove group 220A.

In addition, a width of each of ridges 227 formed between adjacent grooves of the plurality of grooves 225 of the second groove group 220B is also less than a width of each of the ridges 223 of the first groove group 220A.

When a fluid dynamic force is generated between the thrust part 123 of the rotary shaft 120 and the thrust bearing part 115 during rotation of the rotary shaft 120 (see FIG. 4), a higher fluid dynamic force is generated in the second groove group 220B than in the first groove group 220A. If a non-uniform load is applied to the rotating body supported by the rotary shaft 120, the created unbalance during rotation of the rotating body can be compensated by locating the second groove group 220B on a portion where a greater load is applied.

Figure 10:
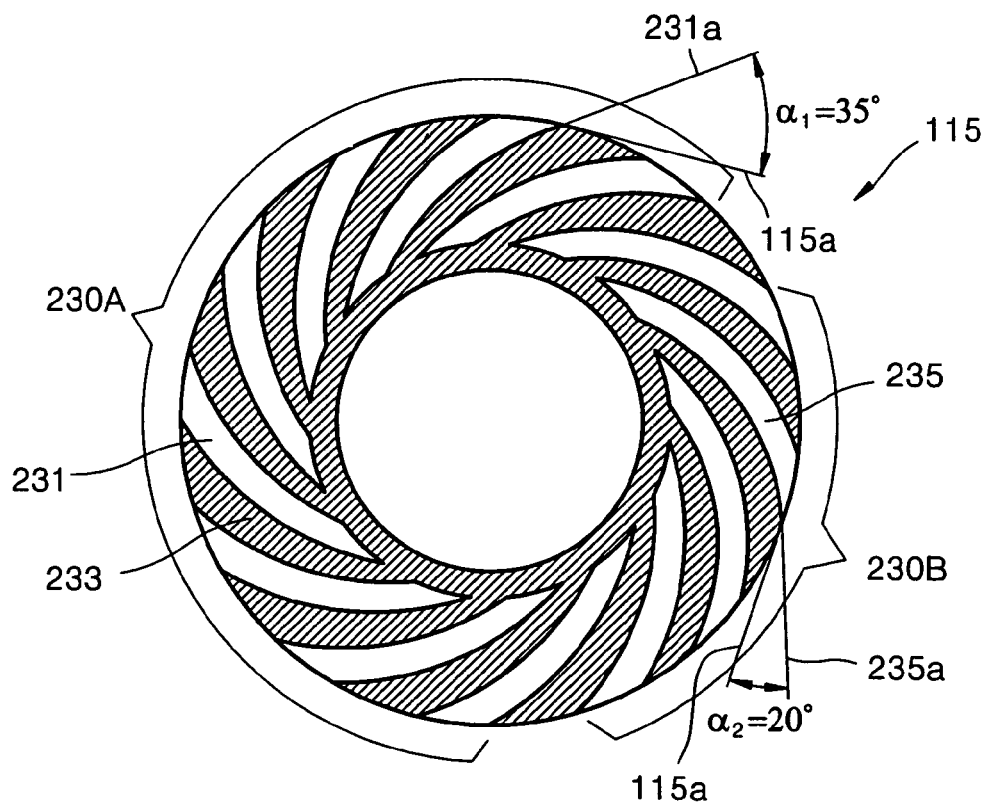
FIG. 10 is a bottom view of a thrust bearing part of a fluid dynamic bearing according to still another exemplary embodiment of the present invention.

Referring to FIG. 10, each of grooves of a thrust bearing part 115 of a fluid dynamic bearing according to still another exemplary embodiment of the present invention has a spiral pattern, and the thrust bearing part 115 is divided into first and second groove groups 230A and 230B.

The first groove group 230A includes a plurality of grooves 231 having the same shape and arrangement and covers more than a half of the annular thrust bearing part 115. Here, each of ridges 233 having the same size is formed between adjacent grooves of the grooves 231.

The second groove group 230B includes grooves 235 with a groove angle $\alpha_2$ different from a groove angle $\alpha_1$ of the grooves 231 of the first groove group 230A. Here, the groove angle $\alpha_1$ is an angle between a tangent line 115a touching an outer circumferential surface of the thrust bearing part 115 and a line segment 231a extending from a groove 231 of the first groove group 230A, and the groove angle $\alpha_2$ is an angle between the tangent line 115a touching the outer circumferential surface of the thrust bearing part 115 and a line segment 235a extending from a groove 235 of the second groove group 230B. Here, it is preferable, but not necessary, that the groove angle $\alpha_1$ be greater than the groove angle $\alpha_2$. FIG. 10 exemplarily shows that the groove angle $\alpha_1$ is 35° and the groove angle $\alpha_2$ is 20°.

The inclination of each of the grooves 235 of the second groove group 230B is greater than the inclination of each of the grooves 231 of the first groove group 230A. Therefore, when a fluid dynamic force is generated between the thrust part 123 (see FIG. 4) and the thrust bearing part 115 during rotation of the rotary shaft 120 (see FIG. 4), a higher fluid dynamic force is generated in the second groove group 230B than in the first groove group 230A. Accordingly, if a non-uniform load is applied to the rotating body supported by the rotary shaft 120, the created unbalance during rotation of the rotating body can be compensated.

Figure 11:
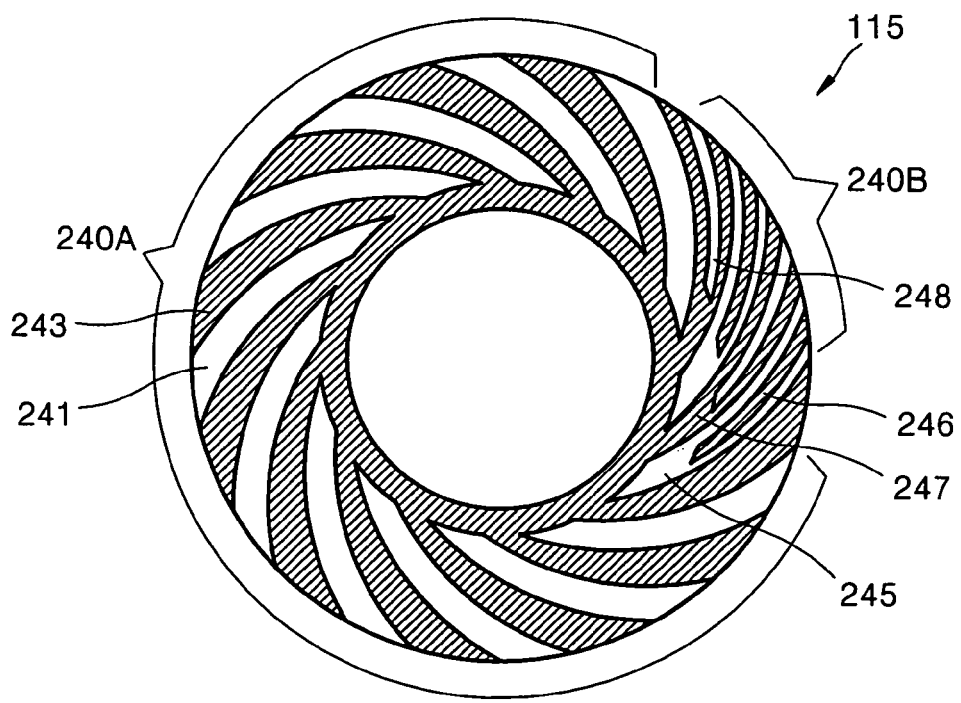
FIG. 11 is a bottom view of a thrust bearing part of a fluid dynamic bearing according to yet another exemplary embodiment of the present invention.

Referring to FIG. 11, each of grooves of a thrust bearing part 115 of a fluid dynamic bearing according to yet another exemplary embodiment of the present invention has a spiral pattern, and the thrust bearing part 115 is divided into first and second groove groups 240A and 240B.

The first groove group 240A includes a plurality of grooves 241 having the same shape and arrangement. Here, each of ridges 243 having the same size is formed between adjacent grooves of the plurality of grooves 241.

The second groove group 240B includes at least one groove 245 adjacent to the first groove group 240A, and the groove 245 has a sub-ridge 246 protruding from the inside thereof. FIG. 10 exemplarily illustrates that the second groove group 240B includes two grooves 245 each having a sub-ridge 246.

Here, a ridge 247 is formed between the grooves 245 of the second groove group 240B to separate the two grooves 245 from each other. A sub-groove 248 is formed in the ridge 247.

The grooves 245 of the second groove group 240B are narrowed due to the sub-grooves 248 and the sub-ridges 246 of the second groove group 240B. Accordingly, when a fluid dynamic force is generated between the thrust part 123 (see FIG. 4) and the thrust bearing part 115 during rotation of the rotary shaft 120 (see FIG. 4), a higher fluid dynamic force is generated in the second groove group 240B than in the first groove group 240A.

Figure 12:
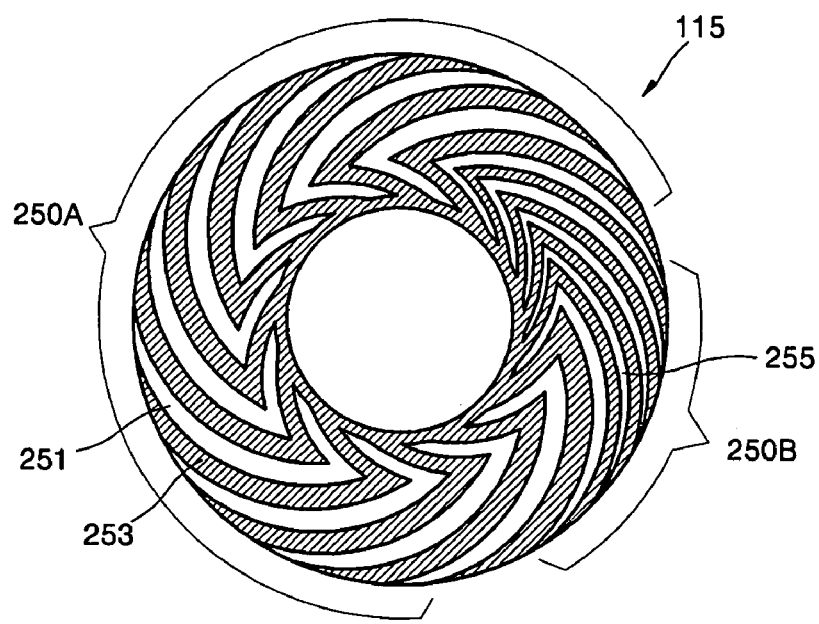
FIG. 12 is a bottom view of a thrust bearing part of a fluid dynamic bearing according to a further exemplary embodiment of the present invention.

Referring to FIG. 12, each of the grooves of a thrust bearing part 115 of a fluid dynamic bearing according to a further exemplary embodiment of the present invention has a V-shaped herringbone pattern, and the thrust bearing part 115 is divided into first and second groove groups 250A and 250B.

The first groove group 250A includes a plurality of grooves 251 having the same shape and arrangement, and each of ridges 253 having the same size is formed between adjacent grooves of the plurality of grooves 251.

The second groove group 250B includes at least one groove 255 asymmetric with respect to the grooves 251 of the first groove group 250A. FIG. 12 exemplarily illustrates that the second groove group 250B includes four grooves 255.

A higher fluid dynamic force is generated in the second groove group 250B than in the first groove group 250A. Accordingly, when a non-uniform load is applied to the rotating body supported by the rotary shaft 120 (see FIG. 4), the created unbalance during rotation of the rotating body can be compensated by locating the second groove group 250B on a portion where a greater load is applied.

In the meantime each of the grooves illustrated in FIGS. 5, 10, and 11 may have a herringbone pattern instead of a spiral pattern.

Figure 13:
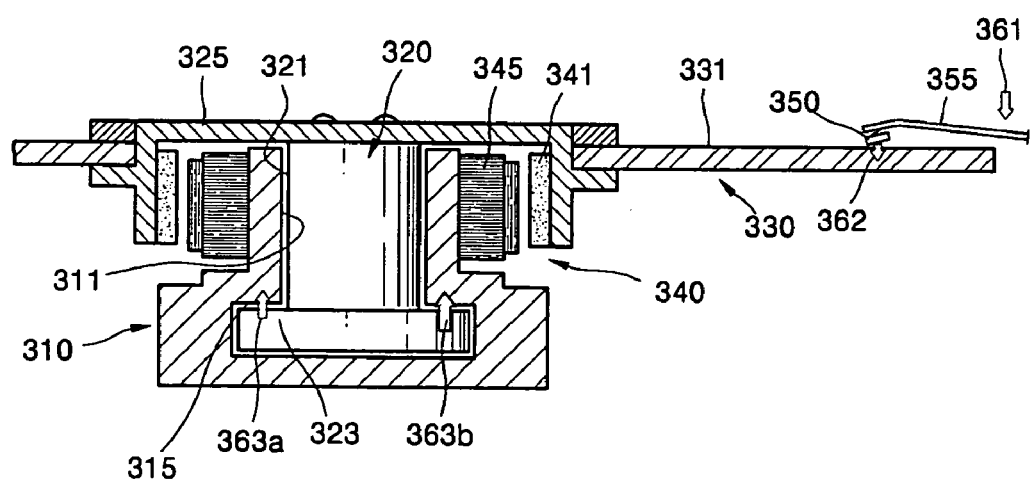
FIG. 13 is a schematic sectional view of an HDD according to an exemplary embodiment of the present invention.

FIG. 13 is a schematic sectional view of a single-head hard disk drive (HDD) according to an exemplary embodiment of the present invention.

Referring to FIG. 13, the HDD includes a hard disk 330 with one recording surface 331 on which information is recorded, a fluid dynamic bearing 310, a rotary shaft 320 rotatably inserted into the fluid dynamic bearing 310 and located at a center of rotation of the hard disk 330, a driving source 340 providing a rotational force to the hard disk 330, and a head 350 recording and reproducing information on the hard disk 330.

The rotary shaft 320 is located at the center of rotation of the hard disk 330 through a rotor housing 325. The rotary shaft 320 includes a journal part 321 supported in a radial direction and a thrust part 323 supported in a longitudinal direction of the rotary shaft 320 by the fluid dynamic bearing 310.

The fluid dynamic bearing 310 has a hollow space into which the rotary shaft 320 is rotatably inserted, and includes a journal bearing part 311 formed along an outer circumference of the journal part 321 and an annular thrust bearing part 315 facing the thrust part 323 and supporting the rotary shaft 320 in the longitudinal direction of the rotary shaft 320. The thrust bearing part 315 and/or the thrust part 323 includes a plurality of grooves (not shown) formed on a surface thereof facing each other. Each of the plurality of grooves has a spiral pattern or a herringbone pattern, and the thrust bearing part 315 is divided into a first groove group and a second groove group according to the arrangement and shape of the grooves. The first groove group includes a plurality of grooves having the same shape and arrangement. The second groove group is located at a portion of the hard disk 330 where a predetermined force 362 is applied by the head 350. The second groove group includes at least one groove asymmetric with respect to the grooves of the first groove group.

Here, since the shapes of the grooves of the first and second groove groups are substantially identical to those of the first and second groove groups explained with reference to FIGS. 5 through 11, a detailed explanation thereof will not be given.

The driving source 340 includes a magnet 341 disposed inside the rotor housing 325, and a stator core 345 formed around an outer circumference of the fluid dynamic bearing 310. The driving source 340 rotates the hard disk 330 using an electromagnetic force generated by applying current to the stator core 345.

The head 350 is disposed on a slider installed at one end of a suspension 355, and records and reproduces information on the recording surface 331 while reciprocating in a predetermined area over the recording surface 331. The slider is lifted when the hard disk 330 rotates, and the head 350 is maintained at a predetermined height due to a gram load 361 applied to the suspension 355. Here, the force 362 counteracting a force of lifting the head 350 is applied to the hard disk 330 in a direction opposite to a direction in which the head 350 is lifted.

Accordingly, when the single head is employed to make the HDD compact, an unbalanced force is applied to the hard disk 330 due to the counteractive force 362 produced between the head 350 and the hard disk 330. However, if the thrust bearing part 315 is configured to have the first and second groove groups as described above, the unbalanced force applied to the hard disk 330 can be compensated. As a result, the hard disk 330 and the rotary shaft 320 can rotate uniformly.

As described above, since the fluid dynamic bearing supporting the rotating body includes the thrust bearing part with the asymmetric grooves, the fluid dynamic bearing can compensate a non-uniform force applied to the rotating body. As a consequence, the rotating body supported by the fluid dynamic bearing can rotate stably.

Furthermore, since the HDD disposes the asymmetric second groove group at a portion of the single head where a counteractive force is applied, the inclination of the hard disk due to the counteractive force during rotation can be compensated. Hence, the hard disk can rotate stably and noises caused by unbalance during rotation can be prevented.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A fluid dynamic bearing comprising:
a journal bearing part supporting a rotary shaft of a hard disk in a radial direction of the rotary shaft;
a thrust part formed at one end of the rotary shaft;
a thrust bearing part facing the thrust part and supporting the rotary shaft in a longitudinal direction of the rotary shaft; and
a plurality of grooves formed on a surface of at least one of the thrust bearing part and the thrust part, wherein the plurality of grooves comprise:
a first groove group disposed on a first portion of the surface and including a plurality of grooves having the same shape and arrangement; and
a second groove group disposed on a second portion of the surface corresponding to a portion of the hard disk where a load is applied by a head, and including at least one groove asymmetric with respect to the grooves of the first groove group,
wherein the second groove group includes a plurality of grooves having different widths, and among the plurality of grooves of the second groove group, a width of a groove located at a center of the second groove group is relatively less than a width of a groove adjacent to the first groove group.

2. The fluid dynamic bearing of claim 1, wherein an angle $\alpha_1$ between a tangent line touching an outer circumferential surface of the thrust bearing part and a line segment extending from a groove of the first groove group and an angle $\alpha_2$ between the tangent line touching the outer circumferential surface of the thrust bearing part and a line segment extending from a groove of the second groove group satisfy the formula: $\alpha_2 < \alpha_1$.

3. The fluid dynamic bearing of claim 1, wherein the second groove group includes at least one groove having a sub-ridge protruding from an inside thereof.

4. The fluid dynamic bearing of claim 3, wherein the second groove group includes a plurality of grooves spaced apart from one another, each of a plurality of ridges is disposed between adjacent grooves of the plurality of grooves of the second groove group to separate the grooves of the second groove group from one another, and a sub-groove is formed in each of the ridges.

5. The fluid dynamic bearing of claim 1, wherein each of the plurality of grooves of the thrust bearing part has a spiral pattern.

6. The fluid dynamic bearing of claim 1, wherein each of the plurality of grooves of the thrust bearing part has a herringbone pattern.

7. A fluid dynamic bearing comprising:
a journal bearing part supporting a rotary shaft of a hard disk in a radial direction of the rotary shaft;
a thrust part formed at one end of the rotary shaft;
a thrust bearing part facing the thrust part and supporting the rotary shaft in a longitudinal direction of the rotary shaft; and
a plurality of grooves formed on a surface of at least one of the thrust bearing part and the thrust part,
wherein the plurality of grooves comprise:
a first groove group disposed on a first portion of the surface and including a plurality of grooves having the same shape and arrangement; and
a second groove group disposed on a second portion of the surface corresponding to a portion of the hard disk where a load is applied by a head, and including at least one groove asymmetric with respect to the grooves of the first groove,
wherein the second groove group includes a plurality of grooves having the same size, shape, and arrangement, a width of each of the grooves of the second groove group is relatively less than a width of each of the grooves of the first groove group, and intervals between adjacent grooves of the second groove group are less than intervals between adjacent grooves of the first groove group.

8. A hard disk drive comprising:
a hard disk with one recording surface on which information is recorded;
a fluid dynamic bearing rotatably supporting a rotary shaft of the hard disk, and including a journal bearing part supporting the rotary shaft in a radial direction of the rotary shaft, a thrust part formed at one end of the rotary shaft, a thrust bearing part facing a thrust part and supporting the rotary shaft in a longitudinal direction of the rotary shaft, and a plurality of grooves formed on a surface of at least one of the thrust bearing part and the thrust part;
a driving source providing a rotational force to the hard disk; and
a head for recording and reproducing information while flying over the recording surface of the hard disk,
wherein the plurality of grooves comprise:
a first groove group disposed on a first portion of the surface and including a plurality of grooves having the same shape and arrangement; and
a second groove group located on a second portion of the surface corresponding to a portion of the hard disk where a load is applied by the head, and including at least one groove asymmetric with respect to the grooves of the first groove group,
wherein the second groove group includes a plurality of grooves having different widths, and among the plurality of grooves of the second groove group, a width of a groove located at a center of the second groove group is relatively less than a width of a groove adjacent to the first groove group.

9. The hard disk drive of claim 8, wherein an angle $\alpha 1$ between a tangent line touching an outer circumferential surface of the thrust bearing part and a line segment extending from a groove of the first groove group and an angle $\alpha 2$ between the tangent line touching the outer circumferential surface of the thrust bearing part and a line segment extending from a groove of the second groove group satisfy the formula: $\alpha 2 < \alpha 1$.

10. The hard disk drive of claim 8, wherein the second groove group includes at least one groove having a sub-ridge protruding from an inside thereof.

11. The hard disk drive of claim 10, wherein the second groove group includes a plurality of grooves spaced apart from one another, each of a plurality of ridges is disposed between adjacent grooves of the plurality of grooves of the second groove group to separate the grooves of the second groove group from one another, and a sub-groove is formed in each of the ridges.

12. The hard disk drive of claim 8, wherein each of the plurality of grooves of the thrust bearing part has a spiral pattern.

13. The hard disk drive of claim 8, wherein each of the plurality of grooves of the thrust bearing part has a herringbone pattern.

14. A hard disk drive comprising:
a hard disk with one recording surface on which information is recorded;
a fluid dynamic bearing rotatably supporting a rotary shaft of the hard disk, and including a journal bearing part supporting the rotary shaft in a radial direction of the rotary shaft, a thrust part formed at one end of the rotary shaft, a thrust bearing part facing a thrust part and supporting the rotary shaft in a longitudinal direction of the rotary shaft, and a plurality of grooves formed on a surface of at least one of the thrust bearing part and the thrust part;
a driving source providing a rotational force to the hard disk; and
a head for recording and reproducing information while flying over the recording surface of the hard disk,
wherein the plurality of grooves comprise:
a first groove group disposed on a first portion of the surface and including a plurality of grooves having the same shape and arrangement; and
a second groove group located on a second portion of the surface corresponding to a portion of the hard disk where a load is applied by the head, and including at least one groove asymmetric with respect to the grooves of the first groove group,
wherein the second groove group includes a plurality of grooves having the same size, shape, and arrangement, a width of each of the grooves of the second groove group is relatively less than a width of each of the grooves of the first groove group, and intervals between adjacent grooves of the second groove group are less than intervals between adjacent grooves of the first groove group.

* * * * *